United States Patent [19]

Yasuda

[11] 3,959,846
[45] June 1, 1976

[54] ROTARY VACUUM SWEEPER IMPROVEMENT

[76] Inventor: Haruma Yasuda, 219 N. Gage Ave., Los Angeles, Calif. 90063

[22] Filed: May 19, 1975

[21] Appl. No.: 578,607

[52] U.S. Cl. ................................. 15/331; 15/354; 15/405
[51] Int. Cl.² .......................................... A47L 5/14
[58] Field of Search ............ 15/328, 331, 334, 340, 15/354, 405; 37/43 R; 56/12.8, 13.3

[56] References Cited
UNITED STATES PATENTS

| | | | |
|---|---|---|---|
| 1,193,475 | 8/1916 | Smith | 15/405 X |
| 3,491,399 | 1/1970 | Dolan et al. | 15/328 X |
| 3,618,157 | 11/1971 | Bassin | 15/331 X |
| 3,863,291 | 2/1975 | Woelffer | 15/328 |
| 3,867,773 | 2/1975 | Gunderson | 37/43 R |

*Primary Examiner*—Peter Feldman
*Assistant Examiner*—C. K. Moore
*Attorney, Agent, or Firm*—William H. Pavitt, Jr.

[57] ABSTRACT

The improvement in a rotary vacuum or suction sweeper of the type wherein vacuum of suction is created underneath the carriage body of a wheeled vehicle by the driven rotation of blower impeller means, within a blower housing comprising a part of the carriage body. Thereby as the sweeper is moved over an area to be cleaned by an operator pushing or pulling a handle extending angularly upwardly from the vehicle in the manner in which one pushes a rotary lawn mower, dirt and debris are sucked up below the carriage body and delivered into a catch bag disposed over duct means extending rearwardly from the rotor impeller housing. With the present invention, a plate valve is interposed in such duct means, which valve, when closed, diverts the air flow from its normal path back into the catch bag, to a forwardly facing duct to which is attached a hoselike element having an open discharge end. Articulated control means are provided to extend downwardly and adjacent the machine operating handle. Such control means may be manipulated by the operator as he is pushing the machine by means of the handle, first close the plate valve, and then, after such closing has been accomplished, to direct the open end of the hose over a predetermined angle both forward and laterally of the vehicle carriage body. Thereby, not only may any dirt and/or debris which are picked up by the suction under the carriage body be blown into certain areas adjacent the sweeper, such as flower beds, gutters, drainage ditches, etc., but through the air stream passing out of the hose nozzle, dirt and/or debris ahead or adjacent the path of the machine may be similarly blown without having to be picked up underneath the machine carriage body.

6 Claims, 6 Drawing Figures

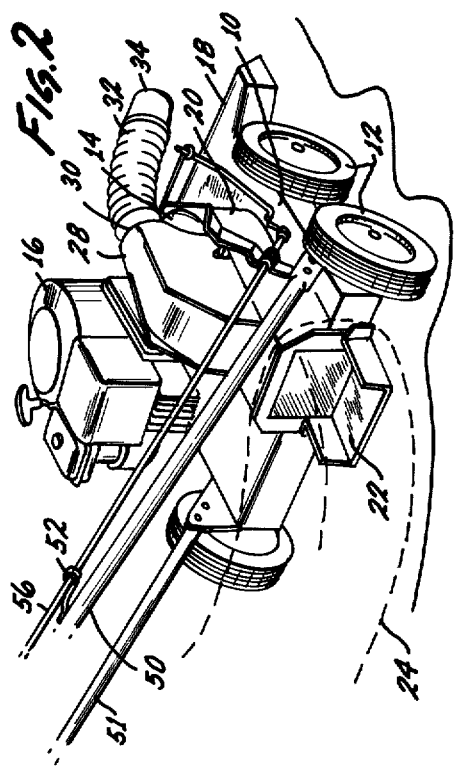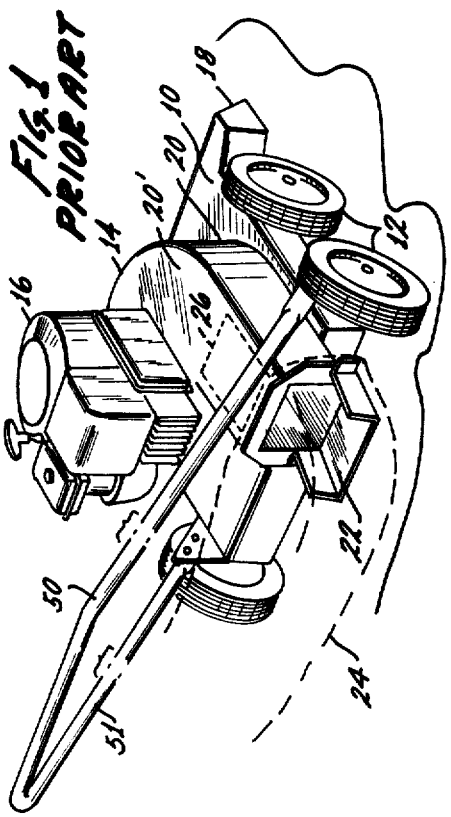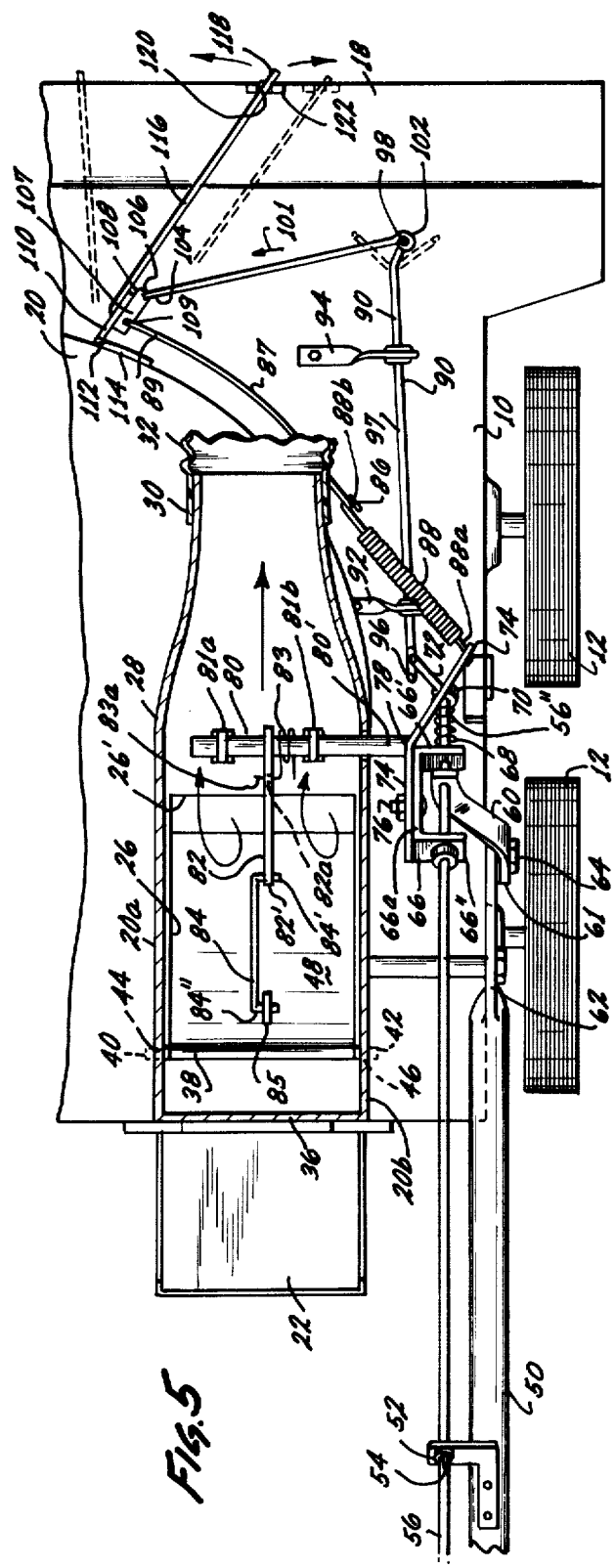

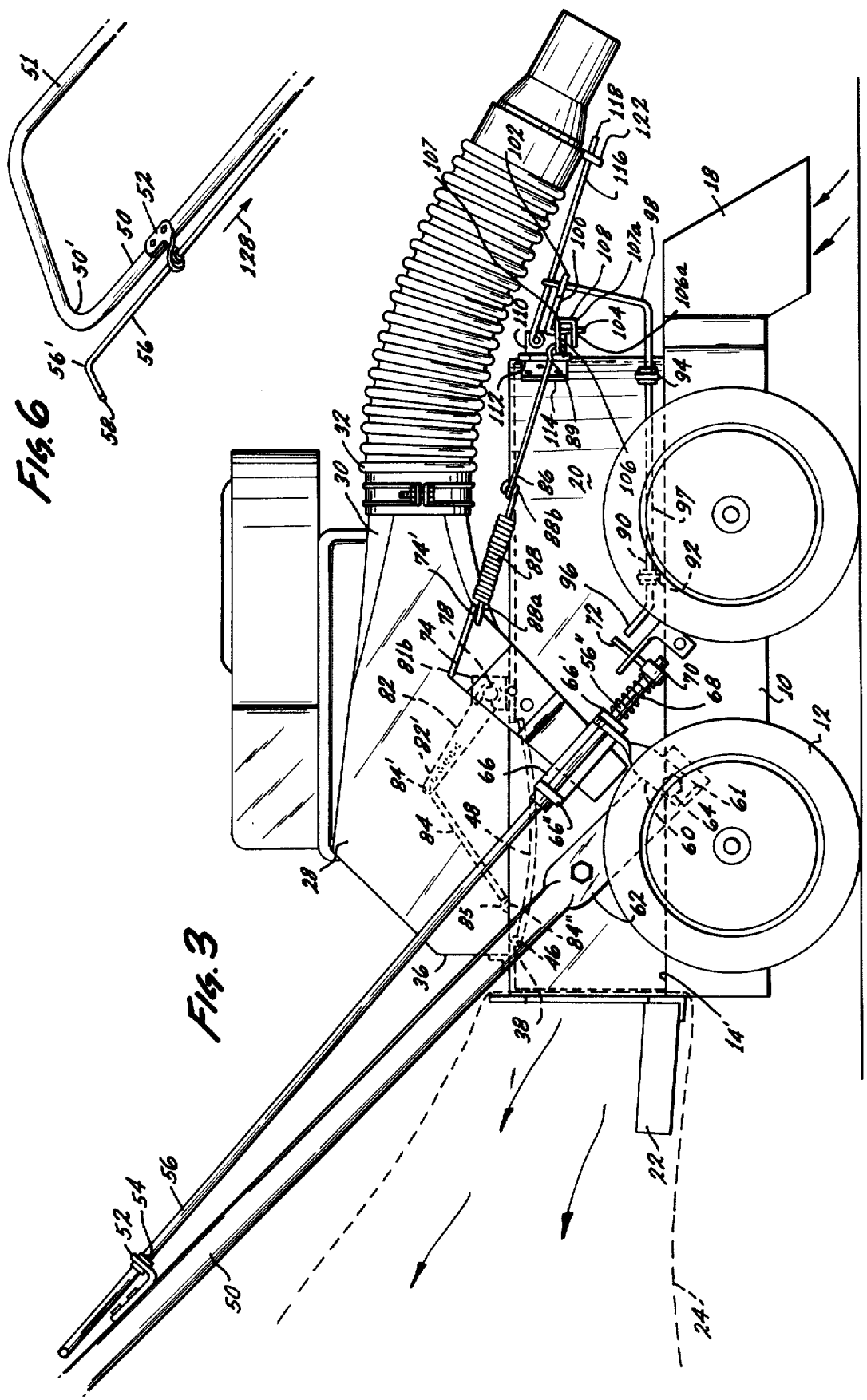

ROTARY VACUUM SWEEPER IMPROVEMENT

BACKGROUND OF THE INVENTION

1. Field of the Invention

This invention relates to flat surface sweeping and cleaning machines in general and in particular to those of the vacuum or suction type where a vacuum condition just above the surface to be swept is created by rotary blower action.

2. Description of the Prior Art

There is currently being manufactured by the Kato Equipment Company of Whittier, California, and sold at least in the Southern California area, a rotary suction type sidewalk or other flat surface sweeper called a VAC-MASTER. What this sweeper looks like is shown in the accompanying drawings and will be more fully described.

In addition, the following patents disclose various prior art sweeper-blower devices:

| | |
|---|---|
| 2,024,367 | Eriksson-Jons |
| 2,053,563 | Kirby |
| 2,099,377 | Smellie |
| 1,207,480 | Blake |
| 2,757,753 | Kasper |
| 3,184,777 | Norden |
| 1,289,809 | Kern |
| 3,016,559 | Holtzclaw |
| 2,983,057 | Erickson |
| 2,991,567 | Erickson |
| 2,896,246 | Wildt |

Also, somewhat related are certain rotary lawn mowers of the type disclosed in the following further patents:

| | | |
|---|---|---|
| Wolf | No. | 3,150,479 |
| Brown | No. | 2,957,295 |
| Duke | No. | 3,212,246 |

While the VAC-MASTER sweeper is effective in accomplishing the purpose for which it is designed, namely, to pick up grass, dirt and debris on a sidewalk or other flat area over which it may be operated, all such picked-up debris is blown out a rearwardly facing dicharge duct and hence must be caught in a sweeper bag attached over the discharge duct outlet; and in order to clean any surface, the sweeper must be run over it in such a way that the surface comes within the low pressure drawing power of the blower inlet means below the sweeper carriage body. In using such a sweeper, however, one will find both areas where, and occasions when it is not necessary or even possible for the sweeper to pick up debris, but it would suffice to blow the debris off a particular surface and into some repository, such as a gutter, flower bed or brush covered area. For this purpose prior to the present invention one would utilize a special blower device.

Also, while some rotary lawn mowers have been devised with lateral or rearwardly directed discharge ducts through which grass cuttings may be ejected, e.g., those of the Brown and Wolf patents; such mowers are generally not designed to operate as vacuum sweepers, but only to dicharge the grass cuttings as the motor blades create them through their cutting action and centrifugal force. In addition, the discharge ducts of these mowers, once set, are fixed until the mower is stopped and taken apart.

Although others have devised sweepers with air blowing capabilities (thus see, for example, the patents referred to above issued to Wildt, Norden, Erickson, Erickson-Jones, Kirby, Smellie, Blake and Kasper); none of these prior art devices is adaptable as a sidewalk sweeper-blower which may be hand-pushed on sidewalks, paths and other surfaces in or around houses and other domestic type buildings to accomplish cleaning of the same in a manner contemplated by and possible with the present invention.

As a practical matter, therefore, the best way of cleaning sidewalks and similar surfaces prior to the present invention has been to use a VAC-MASTER type sweeper and follow it up with a broom, nozzled water hose or separate blower device to sweep off those surfaces or areas into which the VAC-MASTER may not be conveniently maneuvered. This involves not only double effort on the part of the operator but the use of two separate devices, viz. the VAC-MASTER suction sweeper and, the broom, water hose or air blower.

SUMMARY OF THE INVENTION

By the present invention, the necessity for utilizing two different devices in order to accomplish the cleaning of sidewalks or similar surfaces is avoided. This result may be obtained by modifying a VAC-MASTER prior art-type sweeper to the extent of (i) providing an opening in the top defining the rearwardly directed blower outlet duct; (ii) placing over that opening the entrance to a forwardly directed duct; (iii) interposing a plate valve at the rear of the opening with the plate valve being pivotable between a first position in which substantially no interference is provided with the flow of air through the rearwardly directed blower outlet duct, to a second position in which such air flow is blocked from passing to the duct outlet and instead, is diverted upwardly through the opening and into the forwardly directed duct through which the air flow then passes into and out of a flexible blower hose. One end of which is placed over the outlet of the forwardly facing duct. The plate valve is maintained in its first position in the absence of operation of any control mechanism by the sweeper operator. Shifting of the valve plate between its first and second positions and changing of the direction of the flexible hose are accomplished by an articulated series of control elements. The latter are operated manually at the machine handle level by a control rod which is maintained shiftably and rotatably about the rod axis, adjacent one of the two handle members by which the machine is pushed or otherwise locomoted. When the rod is shifted downwardly and is so held against a spring bias, urging the rod back up to its at rest position the plate valve is shifted to its second position. In this lower rod position, also any rotation of the rod about its axis, effects an engagement of a radiating projection on the lower end of the rod with an articulated element to accomplish the swinging of the forwardly and downwardly directed hose toward the left of the machine. Return of the hose to its at rest position in a direction to the right of the machine is accomplished by a spring bias provided on the articulated elements. Such spring bias is sufficient to effect such return in the absence of a force provided by the operator in twisting the control rod to the left.

With the present invention, therefore, not only is the surface over which the wheeled carriage body passes subjected to vacuum cleaning, accomplished by the blower inlet being disposed below the carriage body, in the manner of the prior art, but when the blower output is forwardly directed through the hose, by shifting the valve plate from its first to second position, air stream becomes available to blow debris off the surface just ahead or to the forward sides of the machine, as it is being pushed, into gutters, flower beds or other repositories for such debris.

While the present invention is primarily intended for application to a vacuum-type sweeper, such as the VAC-MASTER, it would also be possible to utilize its principles of construction for application to a rotary power mower to the extent that such mower had a rearwardly directed discharge duct and develops a sufficient air flow through such duct which could be diverted into some type of differently directed blower passage.

BRIEF DESCRIPTION OF THE DRAWINGS

In the accompanying drawings,

FIG. 1 is a perspective view of a prior art-type device, such as the VAC-MASTER sweeper;

FIG. 2 is a perspective view similar to that of FIG. 1 but showing the addition to the sweeper of the forwardly directed duct hose and control means in accordance with the present invention;

FIG. 3 is a side elevation from the right side of the machine shown in FIG. 2, showing the plate valve in its first position;

FIG. 5 is a plan view looking down on the right side of the machine of FIG. 2; and FIG. 6 is a view of the control rod handle.

DESCRIPTION OF THE PREFERRED EMBODIMENT

Figure 4:
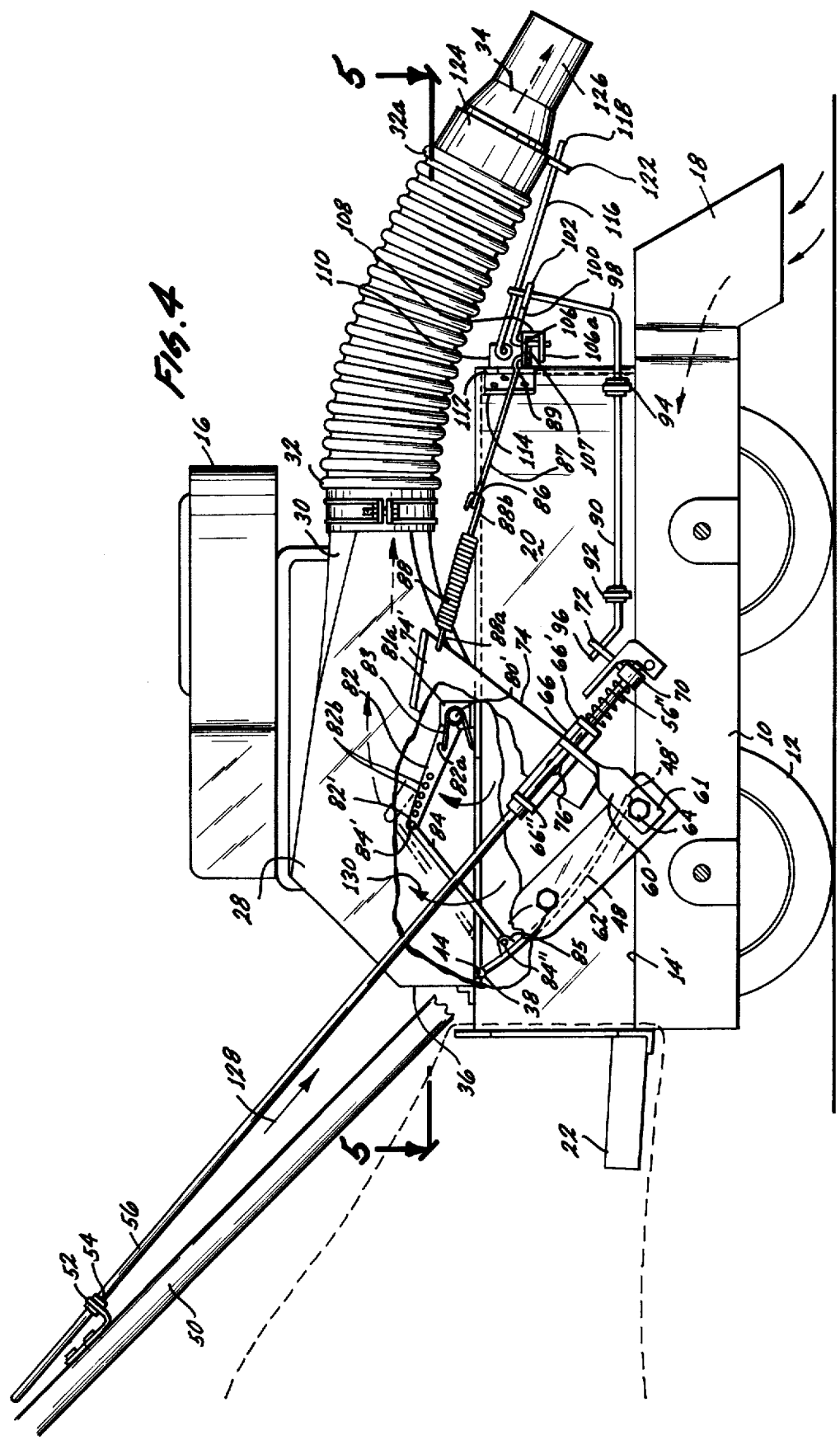
FIG. 4 is a view similar to FIG. 5 but showing the plate valve in its second position.

Referring to FIG. 1 of the drawings, it may be seen that the machine to which the present invention is specially adapted, comprises a carriage body 10 mounted on wheels 12 and including a blower housing 14. The blower itself is not shown in FIG. 1, but it is well understood by those familiar with this VAC-MASTER type prior art machine, to be disposed directly below the motor 16 within the blower housing 14. The inlet to this blower is in communication with the leading downwardly projecting trough 18, and the air flow developed at the blower outlet (also not shown) is passed out through the rearwardly directed duct 20, the outlet 22 of which is usually attached to a catch bag 24 shown in phantom. The machine thus far described forms no part of the present invention.

In order to adapt the present invention to a machine of the type shown in FIG. 1, the top 20' of the duct 20 is provided with an opening shown in dotted lines 26 in FIG. 1, and there is mounted on the top 20' of the duct 20 a forwardly directed duct 28 as shown in FIG. 2. Mounted on the forward end 30 of this duct 28, as an extension of the latter, is a flexible hose-like element 32, having a nozzle 34. As may be better seen in FIGS. 3 and 4, there may also be provided, just forward of the transverse line 35 on the top wall 20' where the rear wall 36 comprising part of the duct 28, attaches to the top wall 20' a pivoting shaft 38. The extremities 40 and 42 of this shaft 38 are passed through orifices 44 and 46 respectively in the side walls 20a, 20b of the duct 20, and said extremities 40, 42 are rotatable within said orifices 40, 46. Welded or otherwise secured to the rotatable shaft 38 is an arcuate valve plate or door 48. This valve plate or door 48 extends, in its first position, parallel to the top 20' of the duct 20 and forward to the front edge 26' of the opening 26 provided in the top wall 20' of the duct 20. As may be seen from FIG. 4, however, the valve plate or door 48 may be pivoted downwardly from its first position to a second position shown in FIG. 4 where its leading edge 48' rests upon the upper surface 14' of the carriage body 10, which upper surface 14' constitutes the bottom wall of the duct 20.

The FIG. 1 type machine is designed to be pushed by a pair of handles 50, 51. In adapting this machine to utilize the present invention, at least one bracket 52 having an orifice 54 is secured to the right-hand handle 50 in such a manner as to permit a rod 56 to be passed slidably through the orifice 54. This rod 56 extends upwardly and angularly from the carriage body 10 almost parallel to the handle 50 to where the handle 50 bends transversely at 50' to extend over to the left-hand handle 51. The upper extremity 56' of the rod 56 terminates in a laterally extending handle 58. The lower extremity 56'' of the rod is supported by an orificed curved bracket 60. The base 61 of the bracket 60 may be mounted on the lower handle plate 62 which is fastened by bolts 64 to the carriage body 10. Fixedly secured on lower portions of the rod 56 is a "U" shaped member 66. The member 66 is so placed on the rod 56 that one of its two legs 66', 66'' is disposed on each side of the bracket 60, thereby limiting the movement of the rod 56 to the distance between the legs 66', 66''. A spring element 68 is interposed between the leg 66' and a terminal cap 70 secured on the end 56'' of the rod 56. Radially projecting from the cap 70 is a rigid member 72, the function of which will be hereinafter more fully described.

A bent arm element 74 may be pivotally attached by a bolt 76 to the top 66a of the "U" shaped member 66. To this arm element 74 may be welded at 78 one end 80' of a transverse element 80 from which extends normally and rearwardly a crank 82. The other end 82' of the crank 82 is rotatably connected to a one best end 84' of a bridging element 84, the opposite best end 84'' of which is rotatably connected to an orificed projection 85 on the arcuate plate valve or door 48 at a point somewhat removed from its pivot shaft 38. The transverse element 80 should be circular in cross-section and is rotatably held in its transverse position by a pair of notched, upwardly projecting legs 81a, 81b of an inverted "U" shaped member 81 which may be welded or otherwise secured to the top wall of the duct 20. In order to insure the return of the arcuate plate or door 48 to its first position and to hold it in such position until adequate force is applied to rotate the transverse element 80, a coiled spring 83, having an extremity 83a passed through an orifice 82a in the crank 82 and wrapped around the element 80, may be provided. Additional orifices 82b in the crank 82, enable the end 84' of the bridging element 84 to be attached differently along the crank for adjusted purposes.

A further bent rod 90 is rotatably disposed slightly forwardly of the capped extremity 56'' of the rod 56 by means of two orificed brackets 92, 94 which are secured to the carriage body 10. As may best be seen in FIGS. 3 and 4, the configuration of the rod 90 is such that its after extremity 96 is angled slightly upwardly from its central portion 97, and its forward extremity 98 is angled almost normally from the straight, central portion 97. A further rod 100 (FIG. 5) having a looped end 102 and an angled opposite end 104 is disposed with its looped end 102 slipped over the extremity 98 of the rod 90, and its other end 104 passed through orifices 106, 106a in the layers 107, 107a respectively in a "U" shaped element 108 secured to the swinging plate 110 of a hinge 112. The other plate 114 of the hinge is secured to the blower housing 14. Also connected to the plate 110 is a still further rod 116 having its outer extremity 118 passed through an orifice 120 in a projection 122 extending radially from a band 124 securing the nozzle 126 to the hose 32. A spring 88 is provided with one end 88a attached to the extremity 74' of the arm element 74 and its other extremity 88b attached to the end 86 of a flexible link 87, the opposite extremity 89 of which also passes through an orifice 109 in the leg 106 of element 108.

In use it may be seen that the sweeper machine may be operated in its conventional manner as a prior art machine shown in FIG. 1. However, should the operator desire to cause any debris ahead of the machine to be blown forward or to the right or left of the front of the machine as he is pushing it along, the operator grasps the handle 58 and shoves the rod 56 downwardly in the direction of the arrow 128 (see FIG. 6) against the urging of the spring 68, thereupon, through the linkage comprising the arm element 76, the member 80, the crank 82 and the interconnecting element 84, the plate valve or door 48 will be pivoted about the axis of the shaft 38 to where the plate end 48' comes to rest on the bottom wall 14' defining the duct 20. When this occurs, the air flow, which theretofore has been passing out of the discharge opening 22 of the duct 20, is diverted upwardly in the direction of the arrows 130 (FIG. 4) and forwardly through the duct 28 and into and through the hose 32 for discharge through the nozzle 126.

When the rod 56 is thus depressed to divert the air flow in the manner just explained, the operator may now control the direction of the hose discharge by turning the handle counterclockwise, whereupon the projection 72 will force the end 96 of the rod 90 to rotate in the same manner thereby to move the rod 100 in the direction of the arrow 101. With such movement the hinge plate 110 will be swung counterclockwise as seen in FIG. 5 to pull with it the rod 116. Thereby, the direction of the hose end 32a and nozzle 126 will be shifted to the left side forward of the machine. Should the operator desire the hose to be re-directed to the right side, he simply releases the counterclockwise pressure on the handle 58, whereupon the spring 88 will urge plate element 74 back to its original position and thereby cause the rod 56 to be rotated clockwise back to its at rest position.

At any time the operator desires to cut off the air flow through the duct 28 and hose 32 and again permit the air flow to pass out rearwardly the duct 20 into the bag 24, he simply releases the downward pressure on the handle 58, whereupon the spring 68, acting against the leg 66' of the element 66 will push the rod 56 back up into its original at rest position.

It may thus be seen that the present invention greatly augments the usefulness of the prior art VAC-MASTER type sweeper in that it adds a directable air blower capability. This enables the machine user not only to shorten the time which may be required to clean off a given sidewalk or other similar surface, but enables him to avoid having to acquire and use a separate blower machine in order to blow debris off the walk and into desired repositories, such as gutters, flower beds and the like.

Also, the present invention, although hereinabove described and illustrated in the drawings in its adaptation to a prior art vacuum sweeper type machine, may also be adapted for use with any rotary power lawn mower having a blower capacity for picking up and blowing rearwardly the grass cuttings rendered by its rotating blades.

I claim:

1. In a rotary vacuum sweeper of the type adapted to be rolled over a sidewalk or other flat horizontal surface and to pick up grass cuttings, dirt and other forms of debris, such type of sweeper having a wheeled carriage body including a housing, a rotary blower mounted on said carriage body within said housing and having blower inlet means disposed below the carriage body and adjacent to, and directed against the surface on which the carriage body is disposed for rolling movement, and a blower outlet duct within said housing, said duct extending from said housing in a first direction and terminating in an opening serving as a discharge passage for debris picked up through the blower inlet means by the low pressure condition therein created upon the rotation of the blower, power means to rotate said blower at a sufficient speed of rotation to create such low pressure condition at the inlet means, and handle means extending upwardly and angularly from said carriage body whereby said wheeled carriage may be locomoted by a force provided by an operator of the sweeper, the improvement which comprises:

A. duct means mounted on said housing and having an outlet directed generally forwardly of said carriage body;

B. flexible hose means, said hose means having one end attached onto said outlet of between duct means and its other end pointed downwardly and adapted to be swung through a predetermined arc the radius of which is centered on said carriage body;

C. valve means disposed in said blower outlet duct, said valve means being movable betwee a first position wherein it provides substantially no interference with the flow of air from said blower to the discharge opening of said duct, and a second position wherein the flow of substantially all air through said outlet duct is diverted from said outlet opening to said duct means from whence it passes through said flexible hose means; and D. articulated control means including a rod extending upwardly from said carriage body and terminating in its upper extremity in a handle whereby the operator of said sweeper may, by grasping said handle and pushing the rod downwardly, first shift the said valve means between its first and second positions, and when said valve means is disposed in said second position, the operator may further direct said hose outlet in any direction within its said predetermined arc by rotating the rod by its handle.

2. The improvement in a rotary vacuum sweeper as described in claim 1 wherein the radius of the arc through which the hose is adapted to be swung at least at some point is directed forwardly of the carriage body.

3. The improvement in a rotary vacuum sweeper as described in claim 1 wherein the rod extends upwardly and angularly adjacent the machine handle means, and retainer means are provided on said handle means slidably and rotatably to hold the said rod in such adjacent relationship to the handle means, whereby the control means may be operated by the sweeper operator manipulating the rod handle at the same time he is utilizing the handle means to locomote the sweeper.

4. The improvement in a rotary vacuum sweeper as described in claim 3 wherein the valve means is normally held in its first position by a spring biasing means, so that when the operator ceases manipulating the control means to shift the valve means and hold it in its second position, the valve means is returned by the spring biasing means to its first position.

5. The improvement in a rotary vacuum sweeper as described in claim 3 wherein the hose outlet is normally maintained in a first direction by the urging of second spring biasing means, the articulated control means includes linkage extending between the hose outlet and the lower extremity of the rod when the latter is disposed in its most downwardly depressed position and when in said depressed position, rotation of said rod operates on said linkage against the urging of said second spring biasing means to swing said hose outlet in an arc to direct the same in a second direction.

6. The improvement in a rotary vacuum sweeper as described in claim 1 wherein the articulated control means is movably supported at its lower extremity on the carriage body.

* * * * *